US012280471B2

(12) United States Patent
Herritz et al.

(10) Patent No.: US 12,280,471 B2
(45) Date of Patent: Apr. 22, 2025

(54) TOOL WITH GEARLESS RATCHET MECHANISM

(71) Applicant: Milwaukee Electric Tool Corporation, Brookfield, WI (US)

(72) Inventors: Devin W. Herritz, Sussex, WI (US); Aaron S. Blumenthal, Shorewood, WI (US); Christian R. Braun, Milwaukee, WI (US); Aaron M. Williams, Milwaukee, WI (US); Ryan C. Dick, Sussex, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 205 days.

(21) Appl. No.: 17/840,257

(22) Filed: Jun. 14, 2022

(65) Prior Publication Data

US 2022/0379441 A1 Dec. 1, 2022

Related U.S. Application Data

(63) Continuation of application No. PCT/US2022/031589, filed on May 31, 2022.

(60) Provisional application No. 63/224,585, filed on Jul. 22, 2021, provisional application No. 63/195,463, filed on Jun. 1, 2021.

(51) Int. Cl.
*B25B 13/46* (2006.01)
*B25B 13/48* (2006.01)

(52) U.S. Cl.
CPC .......... *B25B 13/462* (2013.01); *B25B 13/481* (2013.01)

(58) Field of Classification Search
CPC ............................ B25B 13/462; B25B 13/481
USPC .......................................................... 81/59.1
See application file for complete search history.

(56) References Cited

U.S. PATENT DOCUMENTS 564,250 A * 7/1896 Knowlton ............. F16D 41/088 81/59.1
1,511,226 A * 10/1924 Lawrence ............. B25B 13/462 81/59.1
2,119,622 A 6/1938 Freber
2,139,650 A 12/1938 Anderson et al.
2,584,256 A 2/1952 Brown
2,603,325 A * 7/1952 Pickard ................. B25B 13/462 81/58.3
3,009,372 A 11/1961 Kostka
(Continued)

FOREIGN PATENT DOCUMENTS

CN 2705268 6/2005
CN 2717623 8/2005
(Continued)

OTHER PUBLICATIONS

International Search Report and Written Opinion for International Application No. PCT/US2022/031589 dated Sep. 23, 2022, 10 pages.

*Primary Examiner* — Hadi Shakeri
(74) *Attorney, Agent, or Firm* — Reinhart Boerner Van Deuren s.c.

(57) ABSTRACT

Various designs for a gearless ratchet mechanism and tools incorporating the gearless ratchet mechanism are described. One embodiment relates to a gearless ratchet with a design for improved performance including low or zero swing angle and/or decreased part wear. Another embodiment relates to a gearless ratchet with features designed to maximize life and strength of the tool.

11 Claims, 19 Drawing Sheets

(56) References Cited

U.S. PATENT DOCUMENTS 3,118,696 A * 1/1964 Valter ................ B25B 23/0035 81/177.85
3,204,496 A 9/1965 Ingram
3,823,625 A 7/1974 Myers
4,317,392 A 3/1982 Stephens et al.
4,362,073 A 12/1982 Cloud
4,491,043 A * 1/1985 Dempsey ............. B25B 13/462 81/58
4,669,339 A 6/1987 Cartwright
4,932,508 A * 6/1990 Lederman ............ F16D 41/067 188/82.84
5,136,901 A 8/1992 Williams
5,269,207 A 12/1993 Kuzler
5,509,332 A 4/1996 Donaldson, Jr.
6,055,888 A 5/2000 Mitchell
6,253,646 B1 7/2001 Chang
6,267,027 B1 7/2001 Mitchell
6,367,354 B1 4/2002 Mitchell
6,575,058 B1 6/2003 Mitchell
7,069,819 B2 7/2006 Albertson et al.
7,228,765 B1 * 6/2007 Wu ........................ B25B 13/14 81/170
9,415,486 B2 8/2016 Ludtke et al.
9,597,782 B2 3/2017 Abel
9,902,049 B2 * 2/2018 Douglass ............. B25B 13/481
10,335,928 B2 7/2019 Wang
10,668,600 B1 6/2020 Ye et al.
2005/0160881 A1 7/2005 Niven
2007/0028724 A1 2/2007 Albertson et al.
2007/0084311 A1 4/2007 Albertson et al.
2008/0236977 A1 * 10/2008 Akiyoshi ............. F16D 41/067 192/45.019
2008/0276762 A1 * 11/2008 Dein ..................... B25G 1/105 81/59.1
2016/0271761 A1 * 9/2016 Chang ................ B25B 23/0035
2018/0079055 A1 3/2018 Wang
2018/0141188 A1 5/2018 Lai
2019/0076995 A1 3/2019 Albertson
2019/0126450 A1 5/2019 Gauthier et al.
2020/0180121 A1 6/2020 Chang
2020/0246944 A1 8/2020 Yang et al.
2020/0246945 A1 8/2020 Yang et al.

FOREIGN PATENT DOCUMENTS

CN 101214641 7/2008
CN 201723617 1/2011
CN 102039568 5/2011
CN 204140696 2/2015
CN 107932388 4/2018
DE 1603806 11/1971
DE 2116286 12/1971
DE 2152697 4/1973
DE 2361533 6/1975
DE 2231385 4/1976
DE 2637024 2/1978
DE 3344361 7/1987
DE 9004332 8/1990
DE 9004333 8/1990
DE 9217297 4/1993
DE 29709183 9/1997
DE 29902707 7/1999
DE 202005014846 11/2005
JP 4101880 6/2008
WO WO03039813 5/2003

* cited by examiner

TOOL WITH GEARLESS RATCHET MECHANISM

CROSS-REFERENCE TO RELATED PATENT APPLICATIONS

The present application is a continuation of International Application No. PCT/US2022/031589, filed May 31, 2022, which claims the benefit of and priority to U.S. Provisional Application No. 63/224,585 filed on Jul. 22, 2021, and U.S. Provisional Application No. 63/195,463 filed on Jun. 1, 2021, which are incorporated herein by reference in their entireties.

BACKGROUND OF THE INVENTION

The present invention relates generally to the field of tools. The present invention relates specifically to a tool, such as a ratchet wrench, with a gearless ratchet mechanism.

SUMMARY OF THE INVENTION

One embodiment of the invention relates to a driving tool including a handle coupled to a head. The head includes an outer surface that defines a first dimension, a bore having a surface that defines a second dimension and a clutch mechanism positioned within the bore. The clutch mechanism includes a central body, a plurality of projections extending radially outward from the central body, a plurality of rollers, a drive mechanism supported from the central body and a plurality of springs. Each spring includes a first end and a second end opposing the first end, the first end of each spring coupled to one of the plurality of rollers and the second end of each spring coupled to an adjacent projection.

Another embodiment of the invention relates to a gearless ratchet mechanism for a tool. The gearless ratchet mechanism includes a handle and a head, the head coupled to the handle. The head includes an outer surface that defines a first diameter, a bore positioned within the head and having a cylindrical surface and a clutch mechanism positioned within the bore. The clutch mechanism includes a central body, a plurality of teeth extending radially outward from the central body, a plurality of pins, each pin defining a pin diameter, a drive mechanism supported from the central body and configured to engage a driving tool. The clutch mechanism further includes a plurality of springs. Each spring is coupled to and extends between one of the plurality of pins and a corresponding tooth. Each spring includes a first end engaged with one of the plurality of pins and a second end opposing the first end. When the handle is rotated in a clockwise direction, the plurality of pins engage with the cylindrical surface of the bore such that the drive mechanism is prevented from spinning. When the handle is rotated in a counterclockwise direction the plurality of pins disengage from the cylindrical surface of the bore such that the drive mechanism can spin.

Another embodiment of the invention relates to a driving tool including a handle and a head coupled to the handle. The head includes an outer surface, a bore having a surface and a clutch mechanism positioned within the bore. The clutch mechanism includes a central body, a plurality of teeth extending radially outward from the central body, each tooth including a clockwise facing surface, a plurality of pins, a drive mechanism supported from the central body and configured to engage a socket. The clutch mechanism further includes a plurality of springs. Each spring includes a first end and a second end opposing the first end, the first end of each spring is coupled to one of the plurality of pins and the second end of each spring coupled to an adjacent corresponding tooth. The clutch mechanism further includes a contact angle, the contact angle is defined as the angle between a line joining a first point of contact between one of the plurality of pins and the surface of the bore and a second point of contact between the one of the plurality of pins and the clockwise facing surface of the adjacent corresponding tooth and a radial plane.

Another embodiment of the invention relates to a gearless ratchet mechanism for a tool. The gearless ratchet mechanism includes a handle coupled to a head. The head includes a bore and a clutch mechanism positioned within the bore. The clutch mechanism includes a central body, a plurality of projections, shown as teeth extending radially outward from the central body, a plurality of pins or rollers, a plurality of springs and a drive mechanism. The pins are formed from a first material and an outer race defined by the bore is formed from a second material. The second material has a property (e.g., hardness) different than the property of the first material. The pins have a shape designed to have a contact area such that point loading on the pin is reduced.

Another embodiment of the invention relates to a gearless ratchet mechanism for a tool. The gearless ratchet mechanism includes a handle coupled to a head. The head includes a bore and a clutch mechanism positioned within the bore. The clutch mechanism includes a central body, a plurality of projections, shown as teeth extending radially outward from the central body, a plurality of pins or rollers, a plurality of springs and a drive mechanism. The head further includes an outer surface that at least partially defines a first outer diameter. Each tooth includes a top or upward facing surface, an inner side surface a front side surface and a rear side surface or inner race. A second diameter is defined by the bore and a circular edge of the pin defines a third diameter. The drive mechanism is symmetrical about a plane. An inner contact length is defined between the plane and inner race. A contact angle is defined between a first point of contact between the pin and the bore and a second point of contact between the pin and the inner race.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
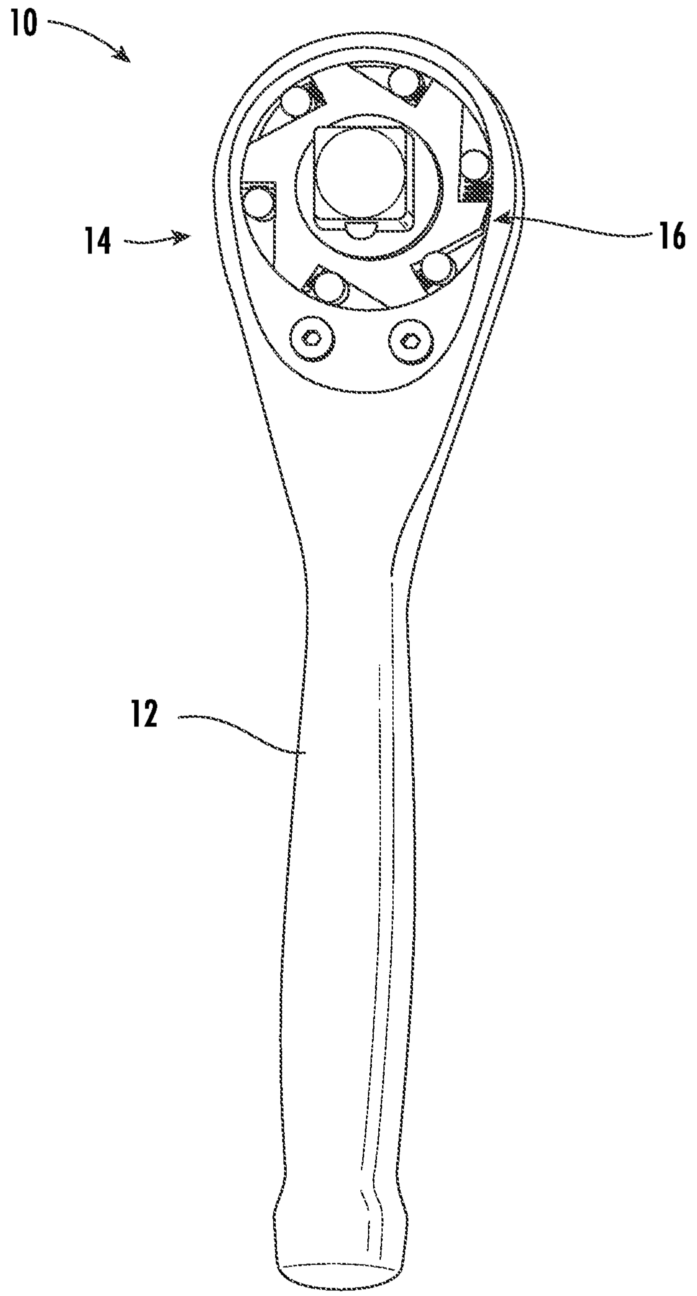
FIG. 1 is a perspective view of a gearless ratchet wrench, according to an exemplary embodiment.

Referring generally to the figures, various embodiments of a gearless ratchet for a tool, such as a ratchet wrench, are shown. Various embodiments discussed herein relate to a gearless ratchet with a design for improved performance including low or zero swing angle and/or decreased part wear. Further, various embodiments relate to a gearless ratchet with features designed to maximize life and strength of the tool. In contrast to the gearless ratchet discussed herein, ratchets that typically include a toothed gear design with a pawl may only be suitable in limited environments due to a discrete number of lockable positions with respect to the tool handle. In small or tight spaces this means a user may have difficulty pivoting the handle back far enough to engage a new tooth. The gearless ratchet discussed herein includes a design for a clutch mechanism that has low or zero arc swing allows for use in more confined work environments.

Further, Applicant has determined that some gearless ratchet designs may have long-term wear across the entire surface of the outer race or bore the clutch mechanism sits within and/or wear in discrete areas of the outer race adjacent to the pins. Both types of wear can cause the clutch mechanism to slip, meaning a decrease in maximum applied torque. Wear in the discrete areas adjacent to the pins may cause the pins to move less smoothly, increasing the friction and/or causing the pins to slip before engaging the clutch body and housing, increasing the swing angle from the desired low or zero-degree swing angle.

In various embodiments, the gearless ratchets discussed herein include clutch designs having pins with geometries believed to increase the contact area between the pin and the outer race and/or through material hardness selection of the pins and outer race. A difference in the material hardness of the pin and outer race can decrease wear on the entire surface of the outer race and/or the discrete areas adjacent to the pins. In some embodiments, the outer race has a hardness greater than the pins and the difference in material hardness allows the spring to push the pins further into an engaged or wedged position as the pin wears down. In other embodiments, the pin has a hardness greater than the outer race and the difference in material hardness reduces the wear on the pin, allowing the pin to maintain its geometry which minimizes the friction between the pin and outer race. Further, Applicant believes wear in discrete areas caused by uneven pin loading (i.e., only some pins engage between the inner and outer races) can be decreased by adding a retaining force via a spring or other component to keep the pins engaged or in a wedged position. The retaining force additionally helps to keep a low or zero-degree swing angle.

Further, Applicant has determined that utilization of the dimensional relationships discussed herein allows for an improved gearless ratchet design. Applicant has identified a range of dimensions for various components of a gearless ratchet mechanism that Applicant believes improves the function of the gearless ratchet mechanism by providing a desired contact angle between the pin or rollers and the outer race to maximize life and strength of the tool. In various embodiments, Applicant has designed the spring to avoid downward sagging and premature bending and/or locking of the clutch mechanism.

Figure 2:
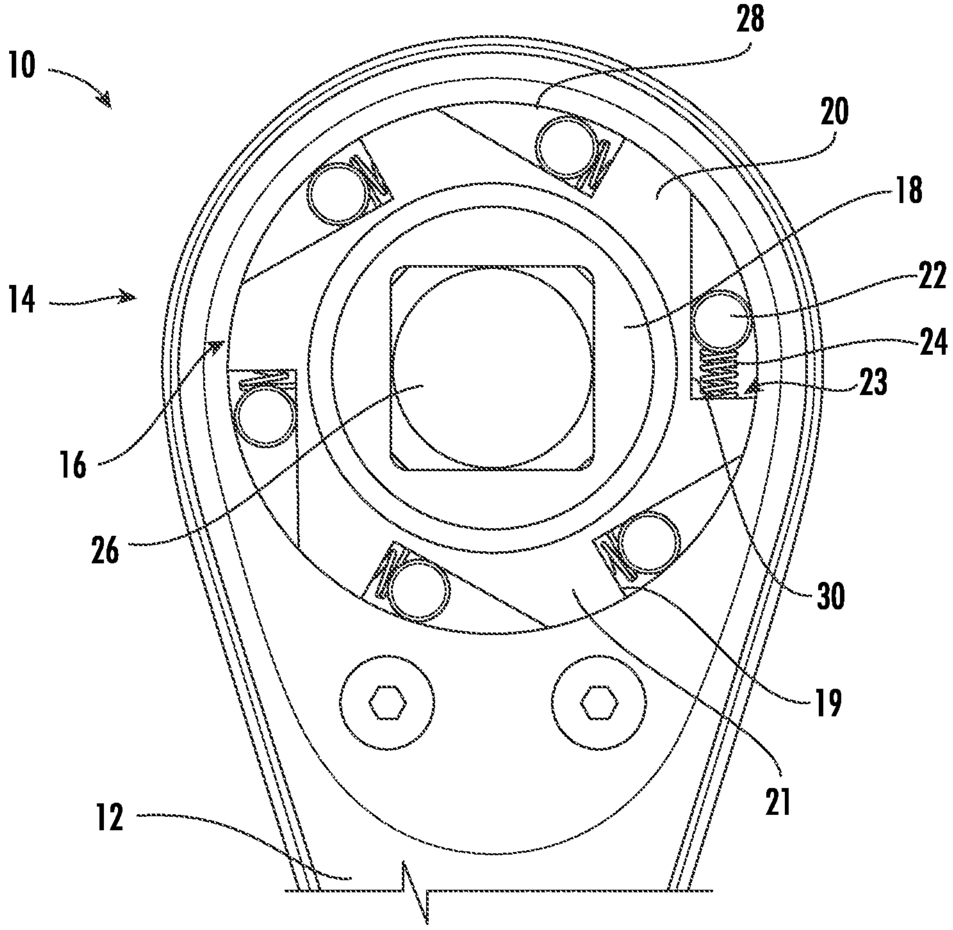
FIG. 2 is a plan view of the gearless ratchet wrench of FIG. 1, according to an exemplary embodiment.
Figure 3:
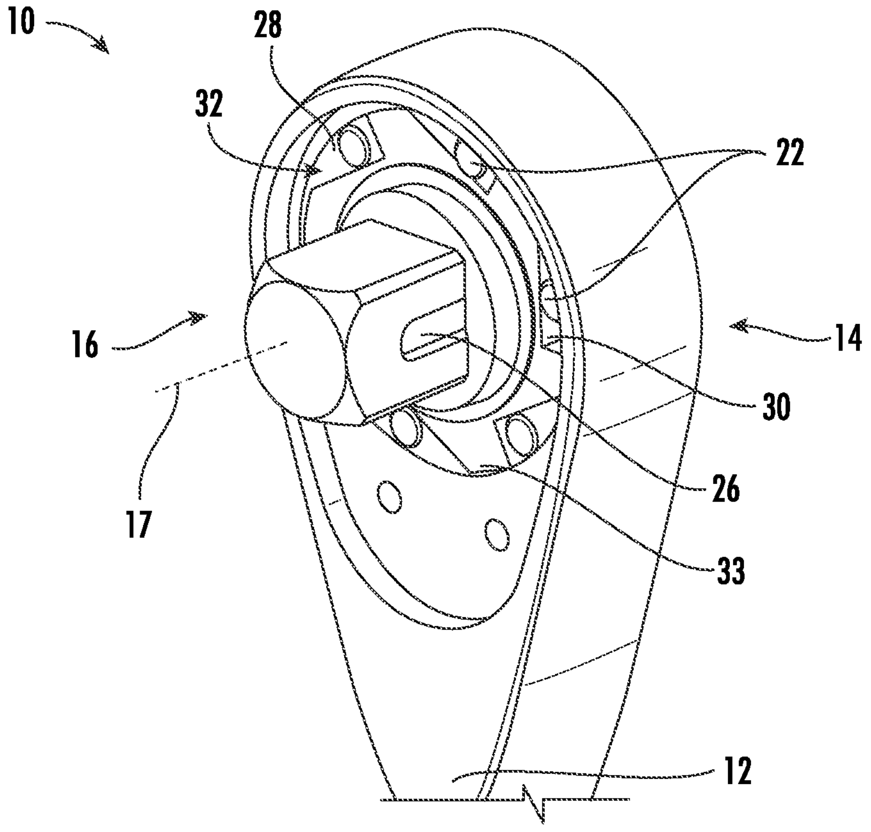
FIG. 3 is a perspective view of the head of the gearless ratchet wrench of FIG. 1, according to an exemplary embodiment.

Referring to FIGS. 1-3, a gearless ratchet for a tool, shown as a gearless ratchet wrench 10, is shown according to an exemplary embodiment. Ratchet wrench 10 includes a handle 12 coupled to a head 14. Head 14 includes a bore 32 and a clutch mechanism 16 positioned within bore 32.

Clutch mechanism 16 includes a central clutch body 18, a plurality of projections, shown as teeth 20 extending outward from central clutch body 18, a plurality of pins or rollers 22, a plurality of springs, shown as coil spring 24 and a drive, shown as square drive 26. Head 14 further includes a central axis 17 extending through square drive 26. Square drive 26 is supported from and/or coupled to central clutch body 18 and configured to engage a driving tool, socket, etc. Teeth 20 extend radially outward from central clutch body 18. In the orientation of FIGS. 1-4, each tooth 20 includes a radially extending circumferentially-facing surface, shown as counter-clockwise facing surface 19, a radially outward facing surface extending in a circumferential direction, shown as surface 33 and a clockwise facing surface 30. Counter-clockwise facing surface 19 is generally perpendicular to radially outward facing, planar surface 21 and joins tooth 20 to central clutch body 18. Radially outward facing, planar surface 21 is perpendicular to central axis 17. Counter-clockwise facing surface 19 extends between the clockwise facing surface 30 of an adjacent tooth 20 and outward facing surface 33. The plurality of springs 24 are coupled to pins 22 and received within bores 23 located on counter-clockwise facing surface 19 of teeth 20. Please note, the descriptions of the tooth surfaces are based on the reference frame of the views shown in the figures, alternative descriptions may be used to describe the same features for a different reference frame.

The clutch mechanism 16 includes the plurality of pins 22 wedged between the clockwise facing surface 30 and the outer surface, shown as cylindrical surface 28 that defines bore 32 (i.e., pins 22 are in an engaged position). In other embodiments, the outer surface may have different shapes (e.g., oblong, polygonal, etc.). In this position, pins 22 prevent square drive 26 from spinning when handle 12 of ratchet wrench 10 is rotated clockwise by a user. When a user rotates ratchet wrench 10 in a counterclockwise direction, pins 22 unwedge (i.e., disengage) from between clockwise facing surface 30 and the outer cylindrical surface 28 and allow the central clutch body 18 and square drive 26 to spin about central axis 17 and with respect to head 14. The pins 22 are biased by a biasing element, shown as compression springs 24 to further reduce the arc swing by maintaining the pins 22 in a position in engagement with outer cylindrical surface 28 and with clockwise facing surface 30 when handle 12 is rotated in a clockwise direction. In operation, pin 22 acts as a bearing, outer cylindrical surface 28 acts as an outer race and clockwise facing surface 30 acts as an inner race. In a specific embodiment, the pins have a generally round shape. In other embodiments the pins may have other shapes (e.g. elliptical, square etc.). In a specific embodiment, there are 6 pins. In other embodiments there may be more of less pins included in the clutch mechanism (e.g. 4, 8, 12 etc.).

In a specific embodiment, the pins 22 are formed from a first material and the outer cylindrical surface 28 is formed from a second material. The second material has a property (e.g. hardness) different than the property of the first material. In specific embodiments, the first material has a first hardness, and the second material has a second hardness greater than the first hardness. In a specific embodiment, the pin is formed from a comparatively softer material and the outer race is formed from a comparatively harder material. In specific embodiments, the first material has a first hardness, and the second material has a second hardness less than the first hardness. In such an embodiment, the pin is formed from a comparatively harder material and the outer race is formed from a comparatively softer material.

Figure 4:
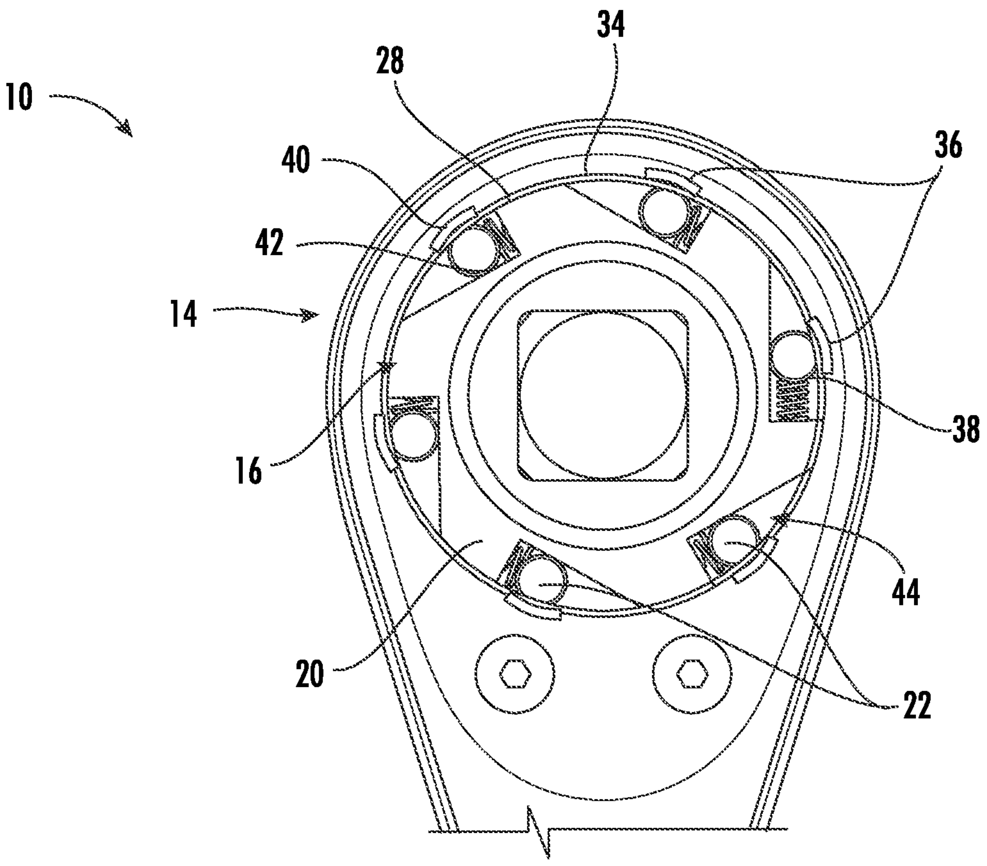
FIG. 4 is a detailed plan view of the head of the gearless ratchet wrench of FIG. 1, showing areas of potential wear on the wrench, according to an exemplary embodiment.

Referring to FIG. 4, details of head 14 of the gearless ratchet wrench 10, showing areas of potential wear on outer cylindrical surface 28 are shown. Long-term wear can occur across the entire surface of the outer cylindrical surface 28 as indicated by highlighted portion 34 and/or in discrete areas 36, shown schematically, located near each pin 22. Pin 22 includes a circular edge 38 extending around pin 22 that defines a side surface 44. Side surface 44 engages with outer cylindrical surface 28 and defines an outer contact area 40 between pin 22 and outer cylindrical surface 28. An opposing portion of side surface 44 similarly engages clockwise facing surface 30 to define an inner contact area 42 between pin 22 and clockwise facing surface 30.

Figure 5:
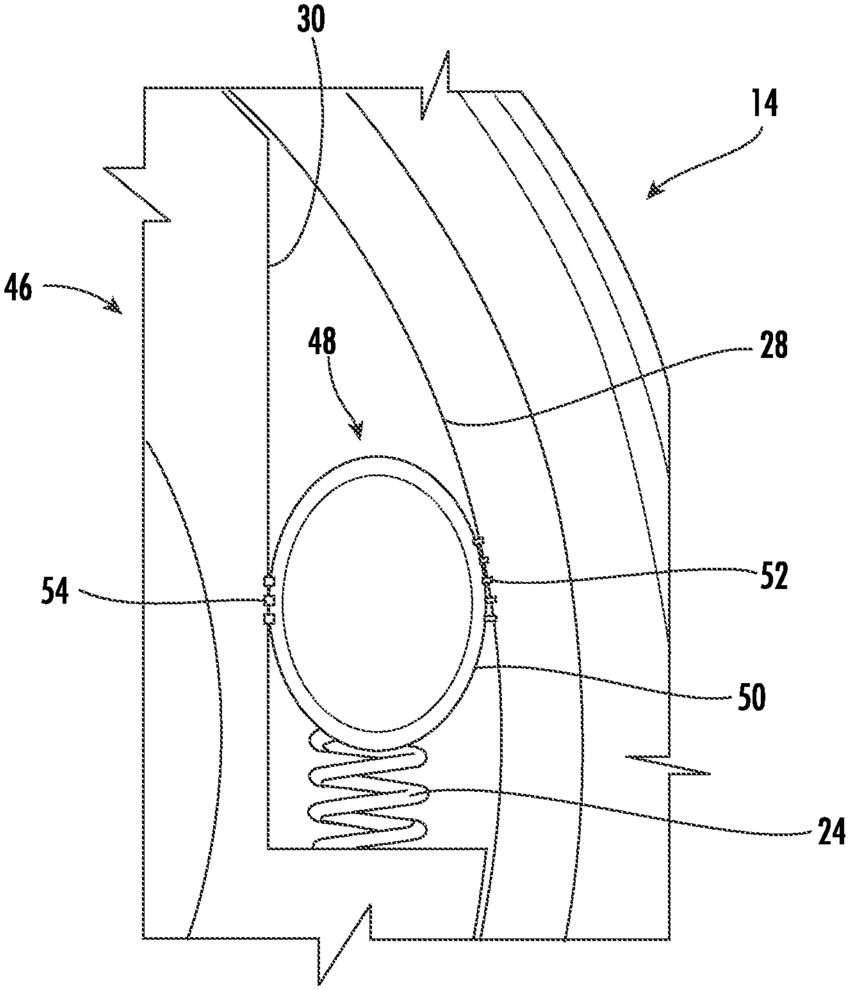
FIG. 5 is a detailed plan view of a portion of a clutch mechanism for a gearless ratchet mechanism, according to an exemplary embodiment.

Referring to FIG. 5, details of a clutch mechanism that can be utilized with gearless ratchet wrench 10 are shown according to another exemplary embodiment. In general, clutch mechanism 46 is substantially the same as clutch mechanism 16 except for the differences discussed herein. Clutch mechanism 46 includes a plurality of springs 24 coupled to pins 48 that have a generally elliptical shape. Pin 48 includes a side surface 50 continuously extending around pin 48. Side surface 50 engages with outer cylindrical surface 28 and defines an outer contact area 52 (shown schematically) between pin 48 and outer cylindrical surface 28. An opposing portion of side surface 50 similarly engages clockwise facing surface 30 of a counter-clockwise adjacent tooth 20 to define an inner contact area 54 (shown schematically) between pin 48 and clockwise facing surface 30. The generally elliptical shape of pin 48 allows for increased size of contact areas 52, 54 relative to a pin with a generally round shape. Applicant believes the problem of wear in discrete areas 36 (see e.g. FIG. 4) caused by high point loading on the outer race can be resolved by increasing contact area between the pin and outer race.

Figure 6:
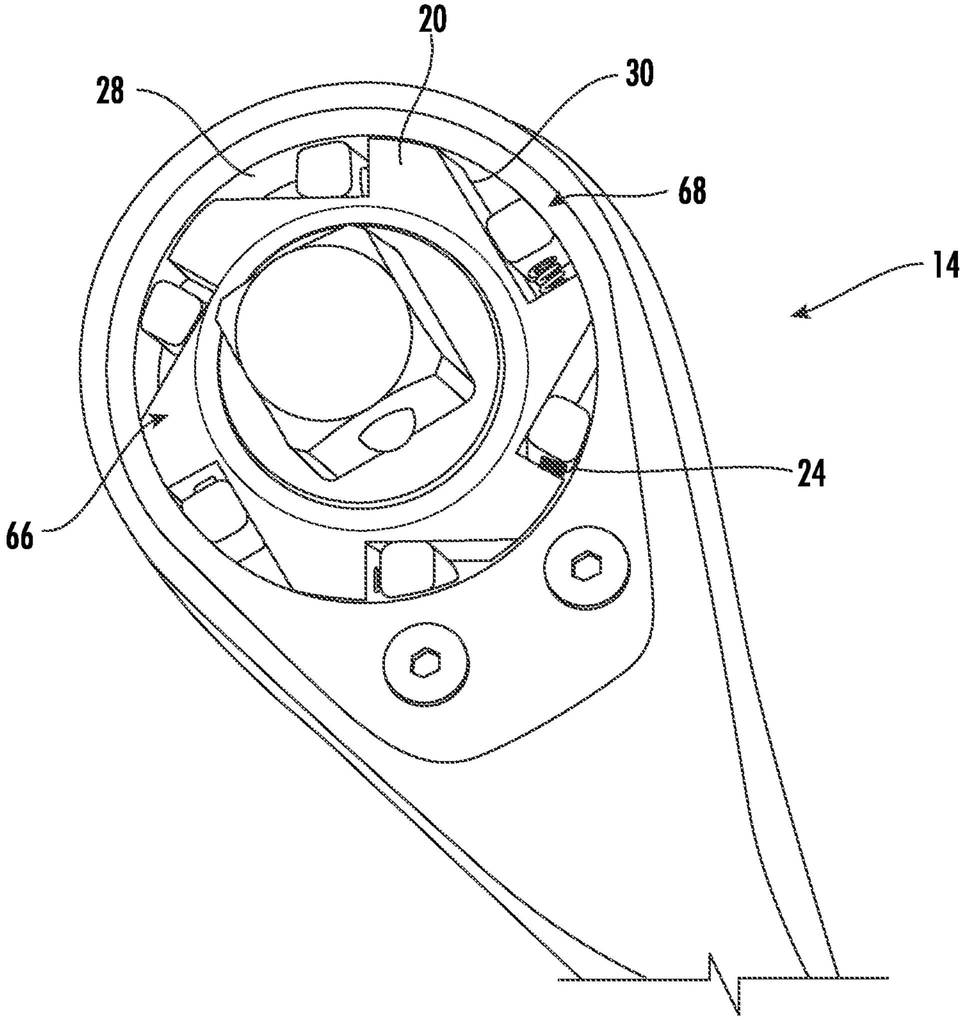
FIG. 6 is a perspective view of the gearless ratchet wrench, according to an exemplary embodiment.
Figure 7:
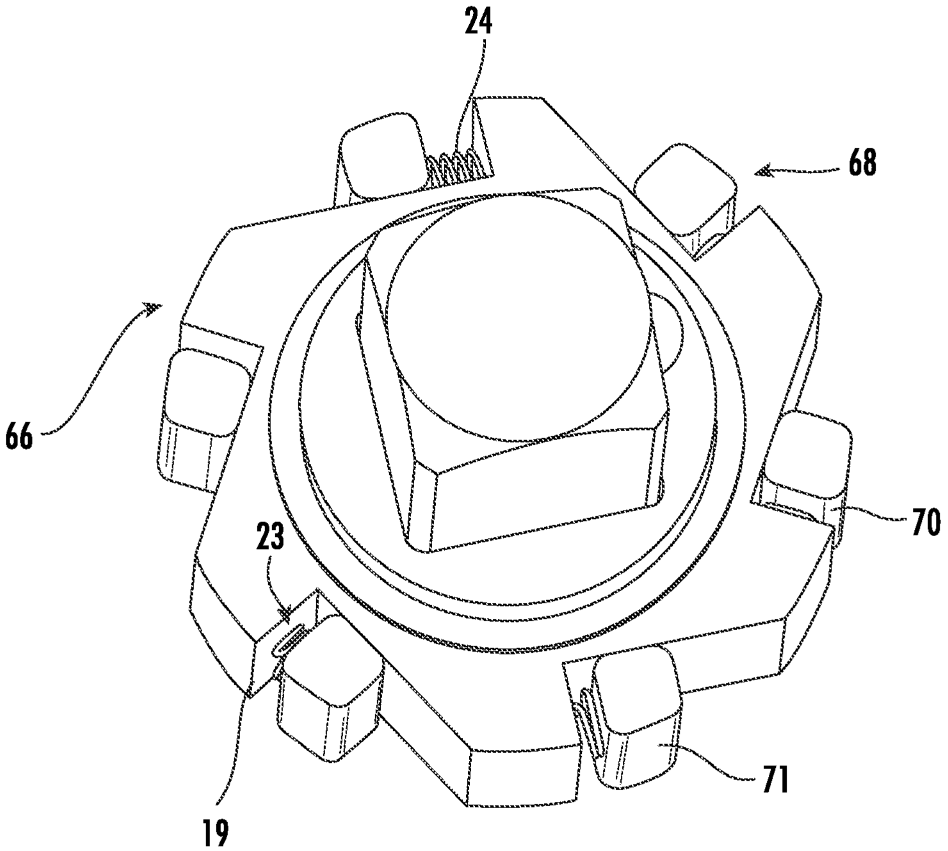
FIG. 7 is a detailed perspective view of a clutch mechanism of the gearless ratchet wrench of FIG. 6, according to an exemplary embodiment.
Figure 8:
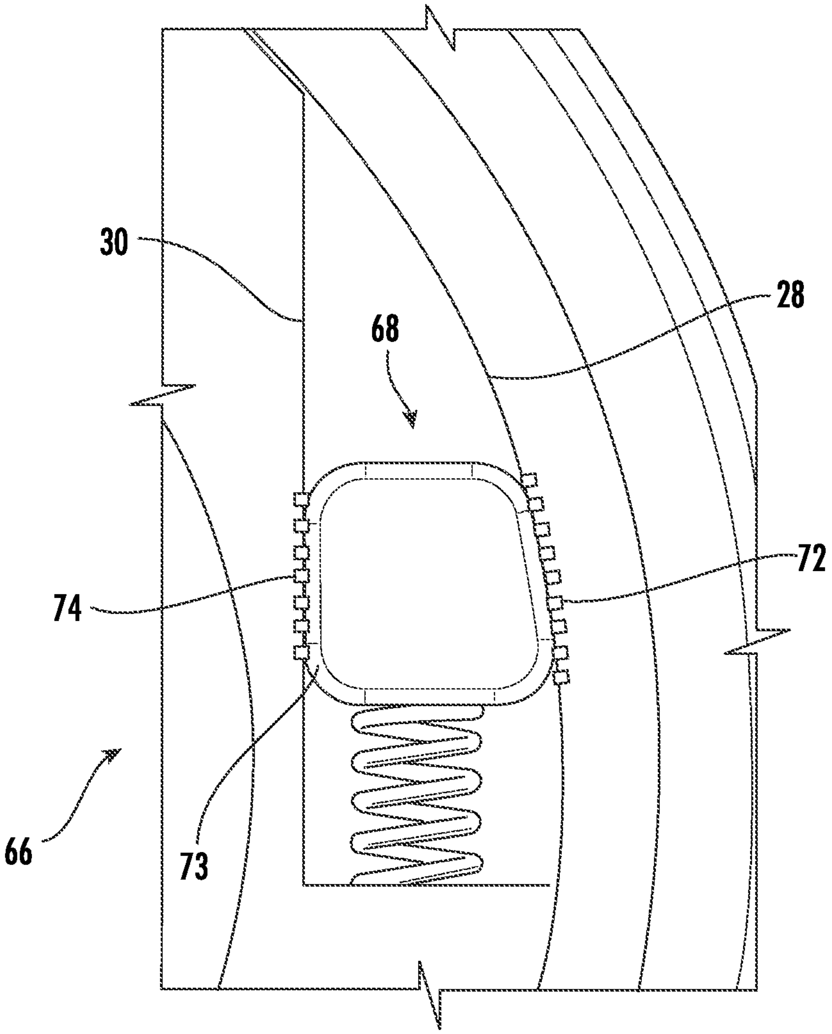
FIG. 8 is a detailed plan view of a portion of the clutch mechanism of the gearless ratchet wrench of FIG. 6, according to an exemplary embodiment.

Referring to FIGS. 6-8, details of a clutch mechanism that can be utilized with gearless ratchet wrench 10 are shown according to an exemplary embodiment. In general, clutch mechanism 66 is substantially the same as clutch mechanisms 16 and 46 except for the differences discussed herein. Clutch mechanism 66 includes a plurality of springs 24 coupled to pins 68 having a wedge shape. Pin 68 includes a side surface 70 continuously extending around pin 68. Side surface 70 includes an outer segment 71 adjacent to and engaging with outer cylindrical surface 28 that defines an outer contact area 72 (shown schematically) between pin 68 and outer cylindrical surface 28. As shown, outer segment 71 is a generally planar segment that is angled inward toward the central axis 17 (See e.g. FIG. 3). Side surface 70 further includes an inner segment 73 adjacent to and engaging with clockwise facing surface 30 that defines an inner contact area 74 (shown schematically) between pin 68 and clockwise facing surface 30. As shown, inner segment 73 is a generally planar segment that is generally parallel to clockwise facing surface 30. The wedge shape of pin 68 allows for increased size of contact areas 72, 74 relative to a pin with a generally round or elliptical shape. Matching the profiles of the contact surfaces (i.e. flat for clockwise facing surface 30 and same radius for outer cylindrical surface 28) maximizes both the inner and outer contact areas.

Figure 9:
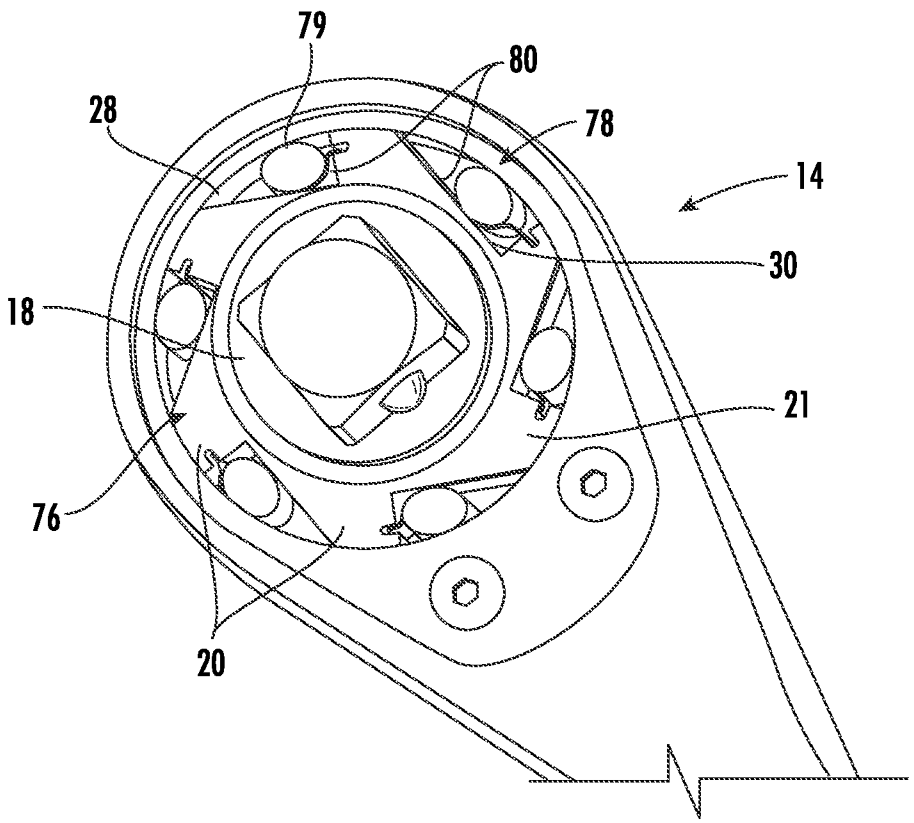
FIG. 9 is a perspective view of the gearless ratchet wrench, according to an exemplary embodiment.
Figure 10:
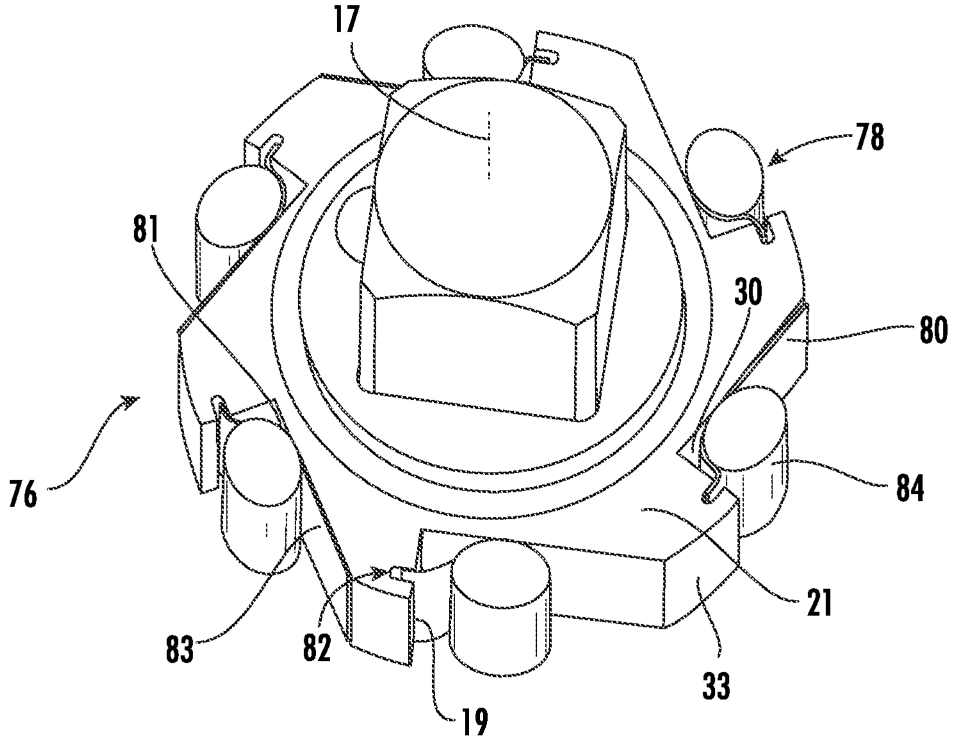
FIG. 10 is a detailed perspective view of a clutch mechanism of the gearless ratchet wrench of FIG. 9, according to an exemplary embodiment.
Figure 11:
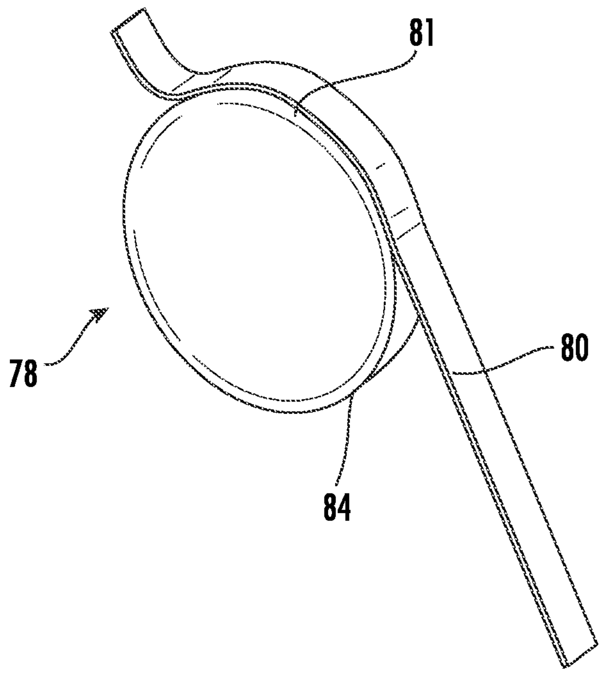
FIG. 11 is a detailed perspective view of portion of the clutch mechanism of the gearless ratchet wrench of FIG. 9, according to an exemplary embodiment.

Referring to FIGS. 9-11, details of a clutch mechanism that can be utilized with gearless ratchet wrench 10 are shown according to an exemplary embodiment. In general, clutch mechanism 76 is substantially the same as clutch mechanisms 16, 46 and 66 except for the differences discussed herein. Clutch mechanism 76 includes a plurality of springs, shown as leaf springs 80 coupled to pins 78. Spring 80 is coupled to counter-clockwise facing surface 19 and more specifically received within a channel 82 located on counter-clockwise facing surface 19 and extending downward through tooth 20. Channel 82 extends from radially outward facing, planar surface 21 through the entirety of tooth 20 in an orientation parallel to central axis 17.

Pins 78 have a generally elliptical shape and include a side surface 84 continuously extending around pin 78. Side surface 84 engages with outer cylindrical surface 28 and defines an outer contact area 79 between pin 78 and outer cylindrical surface 28. The generally elliptical shape of pin 78 allows for increased size of contact area 79 relative to a pin with a generally round shape. An opposing portion of side surface 84 engages with a clockwise facing surface 83 of leaf spring 80 to define a contact area 81 between pin 78 and leaf spring 80. Leaf spring 80 is formed to match the profile of pin 78 ensuring proper positioning and rotation of the elliptical shaped pin. In other embodiments, the leaf spring may be formed to match the profile of an irregularly shaped pin of a different shape (e.g. polygon etc.). Applicant believes the matching of the spring profile to the pin profile provides for improved, more even engagement of the pins. The simultaneous and/or even pin engagement helps to keep a low or zero-degree swing angle.

Figure 12:
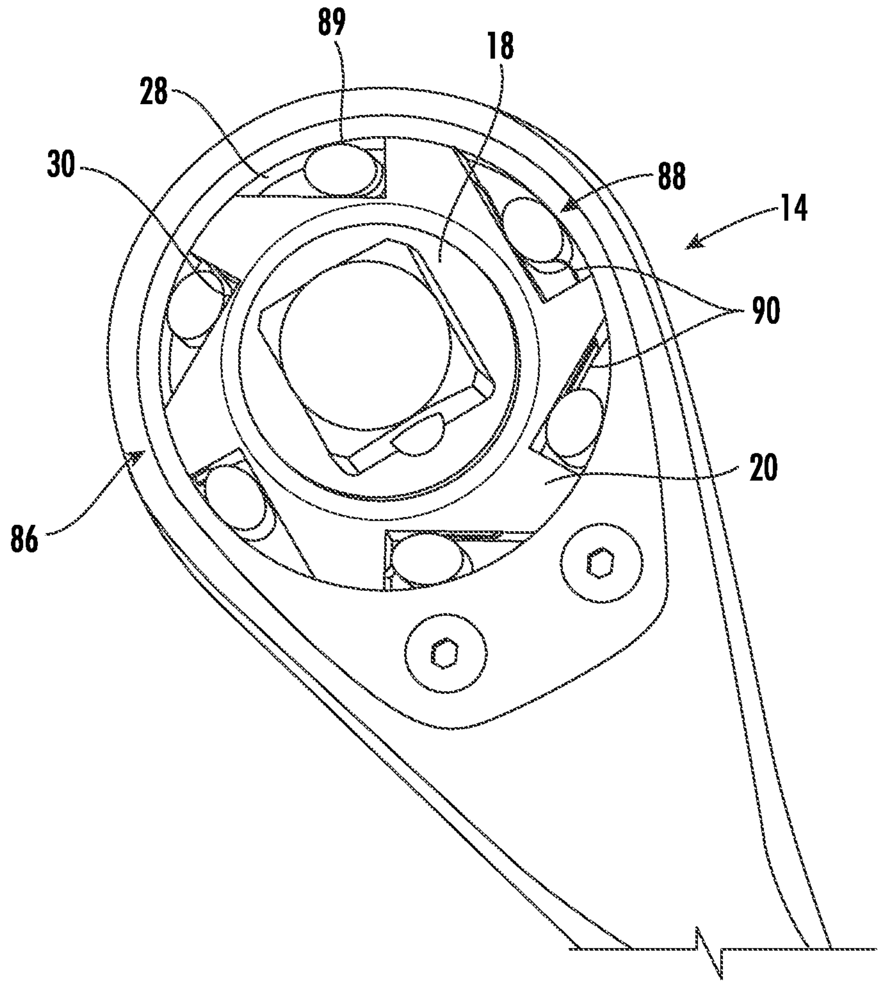
FIG. 12 is a perspective view of the gearless ratchet wrench, according to an exemplary embodiment.
Figure 13:
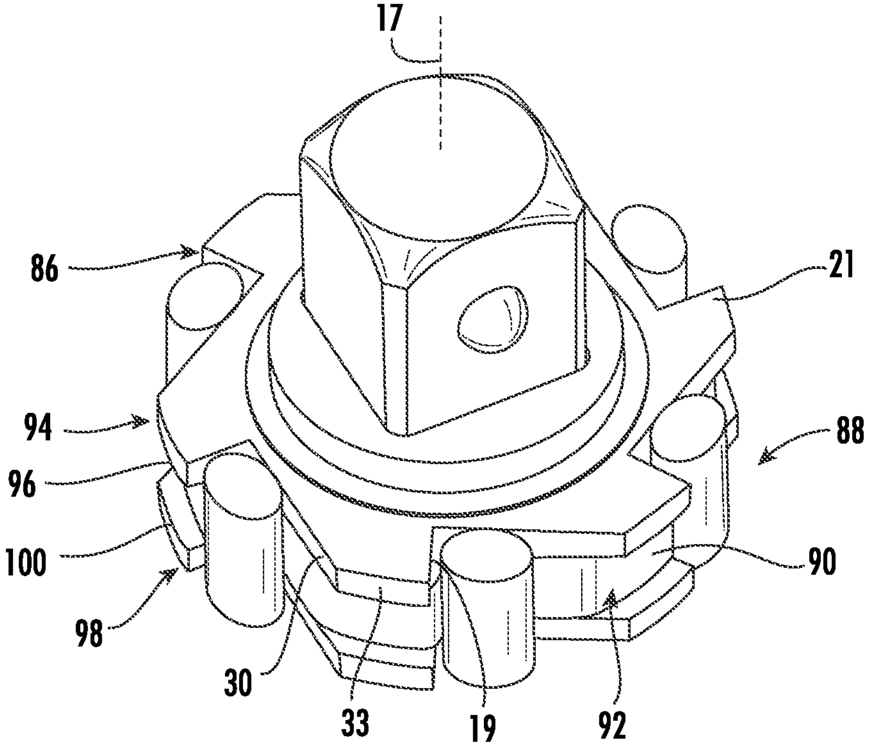
FIG. 13 is a detailed perspective view of a clutch mechanism of the gearless ratchet wrench of FIG. 12, according to an exemplary embodiment.
Figure 14:
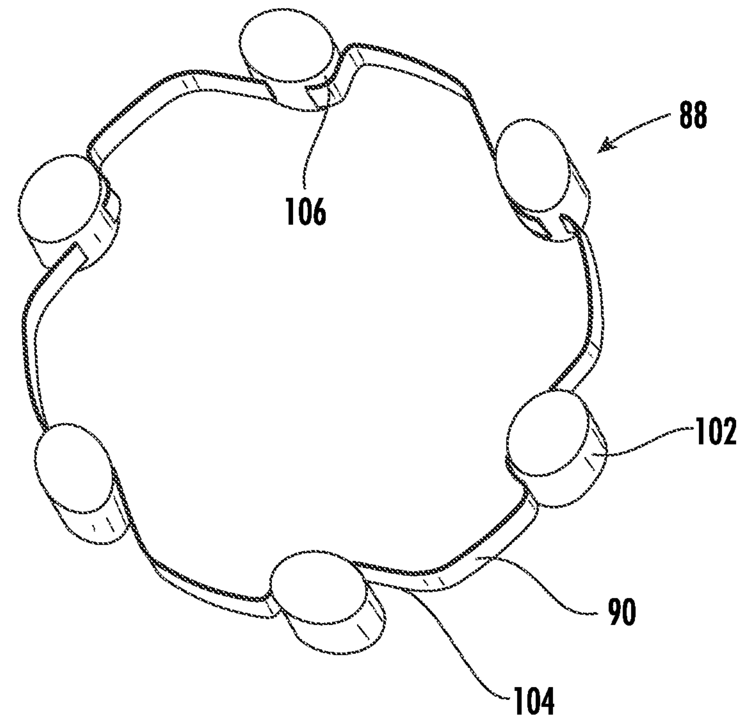
FIG. 14 is a detailed perspective view of portion of the clutch mechanism of the gearless ratchet wrench of FIG. 12, according to an exemplary embodiment.

Referring to FIGS. 12-14, details of a clutch mechanism that can be utilized with gearless ratchet wrench 10 are shown according to an exemplary embodiment. In general, clutch mechanism 86 is substantially the same as clutch mechanisms 16, 46, 66 and 76 except for the differences discussed herein. Clutch mechanism 86 includes a plurality of springs, shown as leaf springs 90 extending around clutch mechanism 86 in a ring and coupled to pins 88. Teeth 20 include a channel 92 extending between the clockwise facing surface 30 and the counter-clockwise facing surface 19. Front side surface 33 has an upper portion 94 with a first edge 96 and a lower portion 98 with a second edge 100 further defining channel 92 that extends between first edge 96 and second edge 100. In a specific embodiment, leaf springs 90 are received within channel 82 and extend around counter-clockwise facing surface 19 and clockwise facing surface 30. The ring formation of leaf springs 90 simplifies the assembly of the clutch mechanism and gearless ratchet wrench 10. In other embodiments, a spring steel band around the entire inner race could be used to further simplify assembly.

Pins 88 have a generally elliptical shape and include a side surface 102 continuously extending around pin 88. Side surface 102 engages with outer cylindrical surface 28 and defines an outer contact area 89 between pin 88 and outer cylindrical surface 28. An opposing portion of side surface 102 engages with a clockwise facing surface 104 of leaf spring 90 to define a contact area 106 between pin 88 and leaf spring 90. Leaf spring 90 is formed to match the profile of pin 88 ensuring proper positioning and rotation of the elliptical shaped pin 88.

Figure 15:
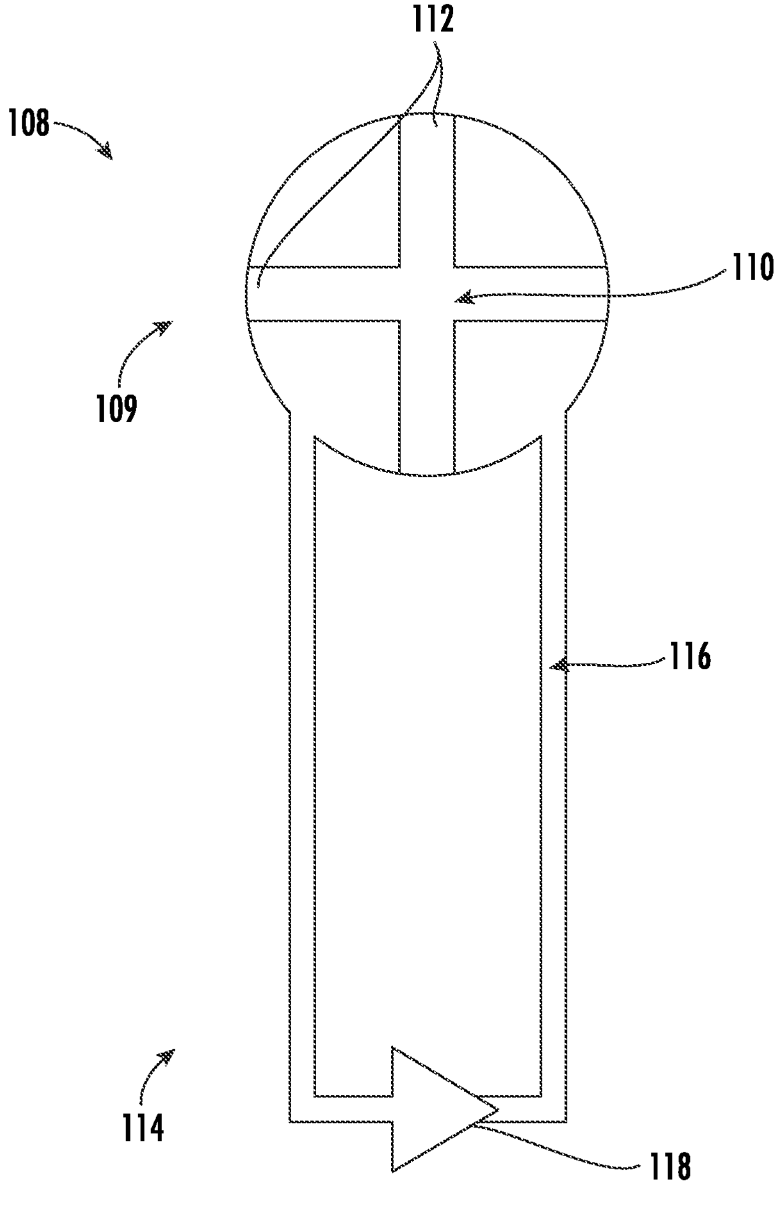
FIG. 15 is a schematic of a one-way ratchet, according to an exemplary embodiment.

Referring to FIG. 15, details of a tool 108 with a gearless ratchet mechanism 109 are shown according to an exemplary embodiment. In general, gearless ratchet mechanism 109 includes a square drive 110 and a plurality of paddles 112 attached to and extending radially outward from the center of square drive 110. Gearless ratchet mechanism 109 further includes a hydraulic system 114. Hydraulic system 114 includes a fluid, such as an incompressible fluid 116, and a reversible one-way valve 118. As paddles 112 rotate in a counter-clockwise direction (in the orientation of FIG. 15), incompressible fluid 116 is pushed and flows easily through one-way valve 118. When paddles 112 rotate in a clockwise direction, incompressible fluid 116 is blocked by one-way valve 118 locking the clutch mechanism 109. In this direction of rotation, fluid 116 prevents paddles 112 from rotating, allowing torque to be delivered from a tool handle to square drive 110.

Referring to FIGS. 16-20, various embodiments of a gearless ratchet designed to maximize strength and life of the tool are described. In general, Applicant has identified a number of dimensions, sizes, shapes, etc. believed to provide a contact angle that produces the desired torque while keeping the head of the ratchet wrench small enough for use in confined spaces. The biasing elements or spring features have been designed to avoid downward sagging and premature bending and/or locking of the clutch mechanism.

Figure 16:
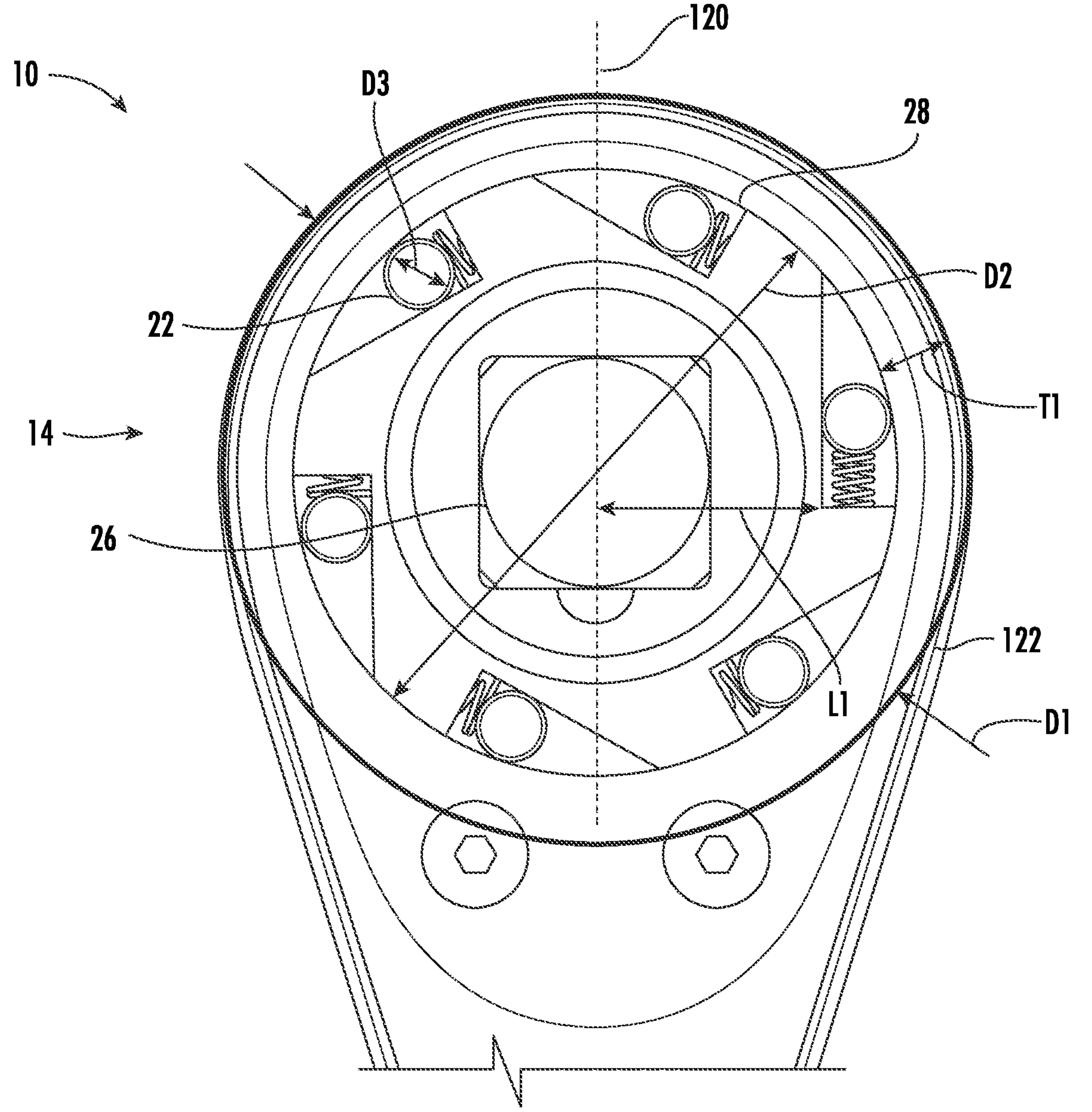
FIG. 16 is a plan view of the gearless ratchet wrench of FIG. 1, showing dimensional relationships between components of the ratchet wrench, according to an exemplary embodiment.
Figure 17:
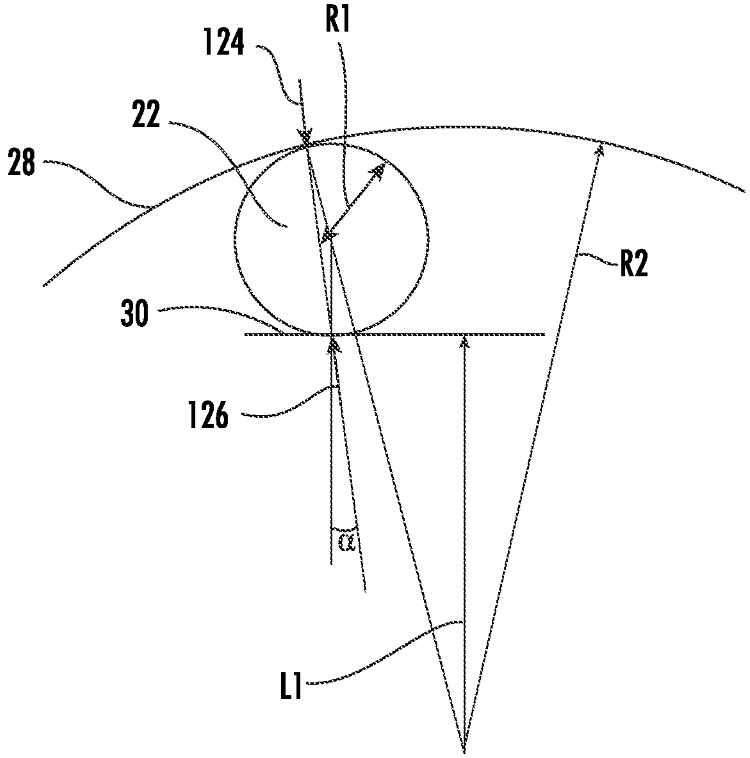
FIG. 17 is a schematic of the relationships between components shown in FIG. 16, according to an exemplary embodiment.
Figure 18:
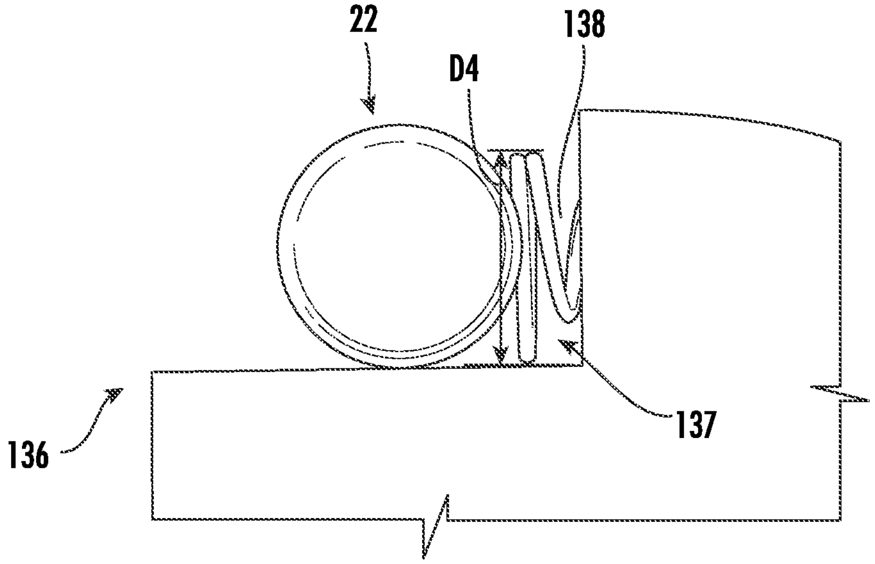
FIG. 18 is a detailed plan view of a portion of a clutch mechanism for a gearless ratchet mechanism, according to an exemplary embodiment.

Referring to FIGS. 16-18, details of the component sizes that can be utilized with gearless ratchet wrench 10 are shown, according to an exemplary embodiment. Head 14 further includes an outer surface 122 that at least partially defines an outer diameter D1. Outer cylindrical surface or outer race 28 defines a diameter D2 and circular edge 38 of pin 22 defines a pin diameter D3. In specific embodiments where outer surface 122 and outer race 28 have different shapes (e.g., oblong, polygonal etc.) D1 is a first dimension and D2 is a second dimension. Square drive 26 is symmetrical about a plane 120. An inner contact length, L1 is defined between plane 120 and clockwise facing surface or inner race 30.

In a specific embodiment, D1 is a maximum ratchet head size that Applicant believes provides for easy use of ratchet wrench 10 in confined spaces, where clutch mechanism 16 includes six pins 22. In a specific embodiment, D1 is 31.5 mm. In such an embodiment, the maximum outer race diameter D2 is between 75% and 95% of D1, specifically between 80% and 90% of D1 and more specifically between 83% and 85% of D1. In such an embodiment, the maximum D2 is about 26.5 mm (e.g., 26.5 mm plus or minus 0.5 mm). The maximum pin diameter D3 is between 5% and 15% of D1, specifically between 9% and 15% of D1 and more specifically between 12% and 14% of D1. In such embodiments, the maximum D3 is about 4.1 mm (e.g., 4.1 mm plus or minus 0.2 mm). The maximum inner contact length L1 is between 20% and 35% of D1, specifically between 22% and 32% of D1 and more specifically between 26% and 29% of D1. In such embodiments, the maximum L1 is about 8.7 mm (e.g., 8.7 mm plus or minus 0.2 mm).

In another specific embodiment, D1 is a maximum ratchet head size that Applicant believes provides for easy use ratchet wrench 10 in confined spaces, where clutch mechanism 16 includes six pins 22. In a specific embodiment, where D1 31.5 mm Applicant has determined feature sizes to provide a contact angle that produces the desired torque. In such an embodiment, the minimum outer race diameter D2 is between 65% and 85% of D1, specifically between 70% and 80% of D1 and more specifically between 76% and 79% of D1. In such an embodiment, the minimum D2 is about 24.4 mm (e.g., 24.4 mm plus or minus 0.5 mm). The minimum pin diameter D3 is between 5% and 15% of D1, specifically between 5% and 11% of D1 and more specifically between 6% and 7% of D1. In such embodiments, the minimum D3 is about 2.2 mm (e.g., 2.2 mm plus or minus 0.2 mm). The minimum inner contact length L1 is between 20% and 35% of D1, specifically between 25% and 35% of D1 and more specifically between 29% and 31% of D1. In such embodiments, the minimum L1 is about 9.5 mm (e.g., 9.5 mm plus or minus 0.2 mm). In a specific embodiment, D1 is 31.5 mm, D2 is 25.25 mm, D3 is 3 mm and L1 is 9.375 mm.

In various embodiments, ratchet wrench 10 may be shaped to have outer diameters D1 while inner contact length L1 is 8.7 mm with a minimum wall thickness T1 where clutch mechanism 16 includes six pins 22. Applicant has determined feature sizes to provide a contact angle that produces the desired torque for ratchet wrench 10. In a specific embodiment, outer race diameter D2 is between 75% and 95% of D1, specifically between 80% and 90% of D1 and more specifically between 85% and 87% of D1. In such an embodiment, D2 is about 34.5 mm (e.g., 34.5 mm plus or minus 0.5 mm). In a specific embodiment, pin diameter D3 is between 10% and 30% of D1, specifically between 15% and 25% of D1 and more specifically between 19% and 22% of D1. In such an embodiment, D3 is about 8.3 mm (e.g., 8.3 mm plus or minus 0.2 mm). In a specific embodiment, inner contact length L1 is between 10% and 30% of D1, specifically between 15% and 25% of D1 and more specifically between 20% and 23% of D1. In such embodiments, D1 is about 40 mm (e.g., 40 mm plus or minus 0.5 mm).

Applicant has determined component sizes to provide a contact angle that produces the desired torque for ratchet wrench 10 where clutch mechanism 16 includes six pins 22. Inner contact length L1 is 8.7 mm with a minimum wall thickness T1. In a specific embodiment, outer race diameter D2 is between 75% and 95% of D1, specifically between 75% and 85% of D1 and mores specifically between 81% and 83% of D1. In such an embodiment, D2 is about 22.7 mm (e.g., 22.7 mm plus or minus 0.5 mm). In a specific embodiment, pin diameter D3 is between 5% and 15% of D1, specifically between 5% and 10% of D1 and more specifically between 7% and 9% of D1. In such an embodiment, D3 is about 2.2 mm (e.g., 2.2 mm plus or minus 0.2 mm). In a specific embodiment, inner contact length L1 is between 20% and 40% of D1, specifically between 25% and 35% of D1 and mores specifically between 30% and 33% of D1. In such embodiments, D1 is about 27.7 mm (e.g., 27.7 mm plus or minus 0.5 mm).

Referring to FIG. 17, details of the component sizes that can be utilized with gearless ratchet wrench 10 are shown, according to an exemplary embodiment. A contact angle α is defined as the angle between the line joining a first point of contact 124 between pin 22 and outer cylindrical surface 28 and a second point of contact 126 between pin 22 and the inner race 30 and the radial plane. As shown, the three dimensions of the clutch mechanism 16 that influence contact angle are the inner contact length L1, the outer race diameter D2 and the pin diameter D3. Applicant believes a contact angle α as described herein provides sufficient torque for the wrench while maintaining a head size that allows for use in confined spaces. In a specific embodiment, α is greater than or equal to 4.3 degrees and less than or equal to 6.37 degrees. In another specific embodiment, α is greater than or equal to 4.3 degrees and less than or equal to 7.48 degrees. Applicant believes contact angles within the range described herein produces an unwedging force in a desired range and while allowing the clutch mechanism to function as desired (e.g., easy to unlock).

Figure 19:
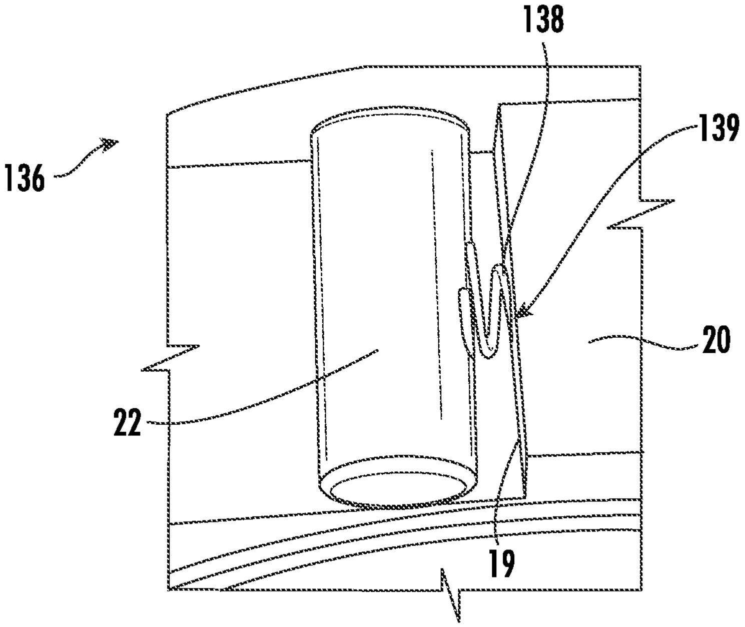
FIG. 19 is a perspective view of the clutch mechanism of FIG. 18, according to an exemplary embodiment.

Referring to FIGS. 18-19, details of a clutch mechanism that can be utilized with gearless ratchet wrench 10 are shown according to an exemplary embodiment. In general, clutch mechanism 136 is substantially the same as clutch mechanisms 16, 46 and 66 except for the differences discussed herein. The biasing element or spring is shown as a generally conical, coil-type spring 138. Generally conical spring 138 includes a first end and a second end opposing the first end, the first end of each generally conical spring 138 is coupled to and/or engaged with the pin 22 and the second end of each spring coupled to and/or engaged with the adjacent corresponding tooth or projection 20. Specifically, the first end of generally conical spring 138 is coupled to pin 22 and the second end is received within bore 139 located on counter-clockwise facing surface 19 of tooth 20. Generally conical spring 138 includes a cone portion 137 that prevents spring 138 from flopping or slumping down due to spinning and friction with pin 22. Cone portion 137 has a diameter D4. In a specific embodiment, D4 is between 70% and 90% of D3.

Generally conical spring 138 extends along and is aligned with a spring axis and has a greater diameter D4, at the first end than a diameter at the second end of spring 138. The diameter of generally conical spring 138 decreases from the first end of each spring as the spring extends toward the counter-clockwise facing surface 19 of the corresponding tooth 20. In a specific embodiment, the diameter of generally conical spring 138 decreases at a constant rate. In another embodiment the diameter of generally conical spring 138 may decrease at another rate (e.g., exponential, etc.). Applicant believes use of a generally conical spring shape helps to maintain the orientation of the spring and provides stability to the pin. The alignment of generally conical spring 138 with a larger diameter portion engaging with pin 22 retains the spring 138 in place and maintains the spring positioning along the spring axis.

Figure 20:
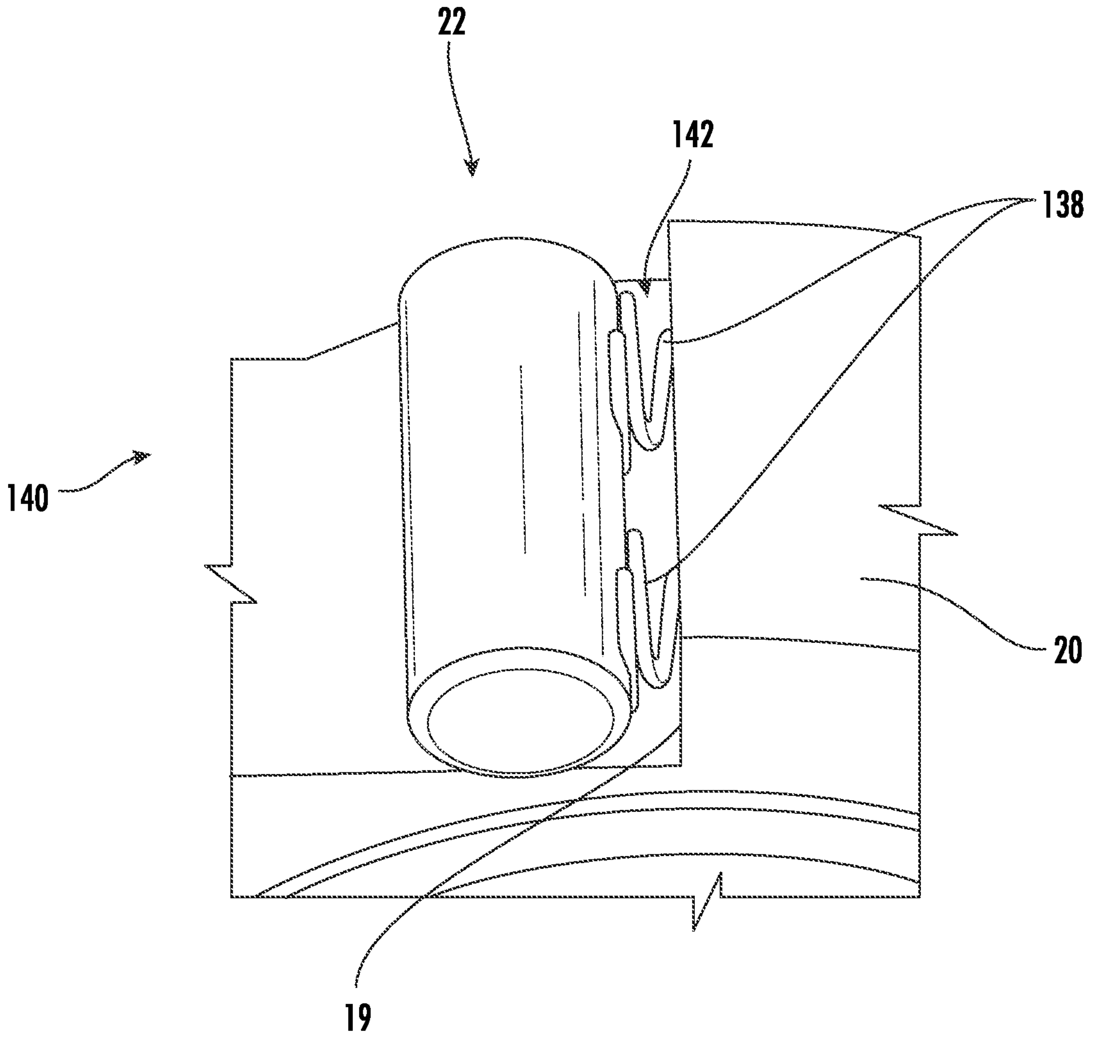
FIG. 20 is a perspective view of a portion of a clutch mechanism for a gearless ratchet mechanism, according to an exemplary embodiment.

Referring to FIG. 20, details of a clutch mechanism that can be utilized with gearless ratchet wrench 10 are shown according to an exemplary embodiment. In general, clutch mechanism 140 is substantially the same as clutch mechanisms 16, 46, 66 and 136 except for the differences discussed herein. The springs, shown as conical, coil-type springs 138 are coupled to pin 22 and received within bores 142 located on counter-clockwise facing surface 19 of tooth 20. In a specific embodiment, two conical springs 138 are used for each pin 22. In other embodiments, a different number of conical springs may be used (e.g., 1, 3, etc.). Applicant believes the use of multiple conical, coil-type springs keeps even pressure on the pins preventing the pins from becoming locked or crooked prematurely.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A driving tool comprising:
a handle;
a head coupled to the handle, the head comprising:
an outer surface that defines a first dimension;
a bore having a surface that defines a second dimension; and
a clutch mechanism positioned within the bore, the clutch mechanism including:
a central body;
a plurality of projections extending radially outward from the central body;
a plurality of rollers;
a plurality of springs, each spring including a first end and a second end opposing the first end, the first end of each spring coupled to one of the plurality of rollers and the second end of each spring coupled to an adjacent projection; and
a drive mechanism supported from the central body;
wherein each of the plurality of springs includes a first diameter at the first end and a second diameter at the second end of each spring, and wherein the first diameter of each spring is different than the second diameter of each spring;
wherein the second dimension is between 75% and 95% of the first dimension; and
wherein the second dimension is about 26.5 mm.

2. The driving tool of claim 1, wherein the plurality of projections each include a clockwise facing surface and wherein the drive mechanism is symmetrical about a plane such that an inner contact length is defined between the plane and the clockwise facing surface of one of the plurality of projections.

3. The driving tool of claim 2, wherein the inner contact length is between 20% and 35% of the first dimension.

4. The driving tool of claim 2, wherein the inner contact length is about 8.7 mm.

5. The driving tool of claim 1, wherein the drive mechanism is a square drive.

6. The driving tool of claim 1, wherein the first diameter of each spring is greater than the second diameter of each spring.

7. The driving tool of claim 1, wherein the plurality of rollers includes 6 rollers.

8. A gearless ratchet tool comprising:
a handle;
a head coupled to the handle, the head comprising:
an outer surface that defines a first diameter;
a bore positioned within the head and having a cylindrical surface; and
a clutch mechanism positioned within the bore, the clutch mechanism including:
a central body;
a plurality of teeth extending radially outward from the central body;
a plurality of pins, each pin defining a pin diameter;
a plurality of springs each spring coupled to and extending between one of the plurality of pins and a corresponding tooth, each spring including a first end engaged with one of the plurality of pins and a second end opposing the first end, wherein each of the plurality of springs includes a spring diameter, the spring diameter decreasing from the first end of each spring as each spring extends toward a counter-clockwise facing surface of the corresponding tooth; and
a drive mechanism supported from the central body and configured to engage a driving tool;
wherein, when the handle is rotated in a clockwise direction, the plurality of pins engage with the cylindrical surface of the bore such that the drive mechanism is prevented from spinning and wherein, when the handle is rotated in a counterclockwise direction the plurality of pins disengage from the cylindrical surface of the bore such that the drive mechanism can spin;
wherein the pin diameter is between 5% and 15% of the first diameter; and
wherein the pin diameter is about 4.1 mm.

9. The gearless ratchet tool of claim 8, wherein the maximum first diameter is 31.5 mm.

10. The gearless ratchet tool of claim 8, wherein two springs are engaged with each pin.

11. The gearless ratchet tool of claim 8, wherein the spring diameter of each spring at the first end is between 70% and 90% of the pin diameter.

* * * * *